(No Model.)
D. H. ELLINGTON.
COTTON PLANTER.
No. 394,163. Patented Dec. 11, 1888.
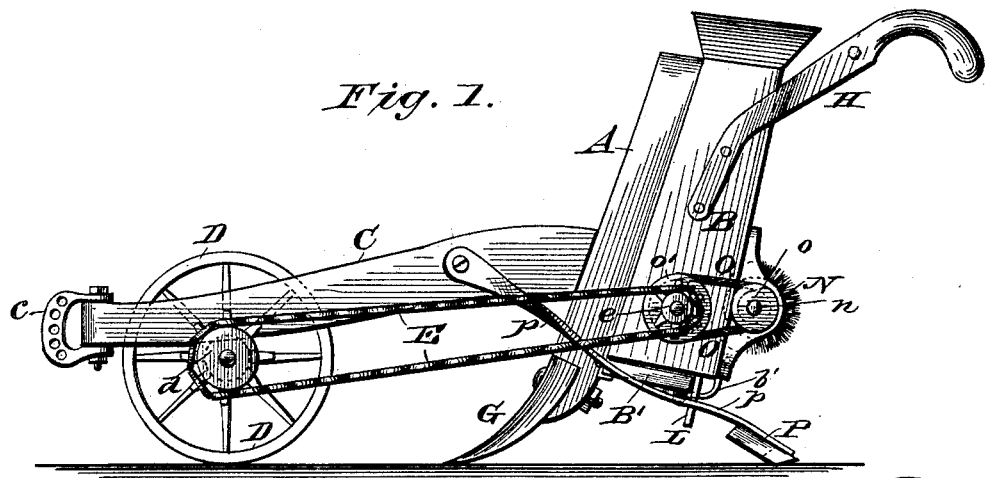
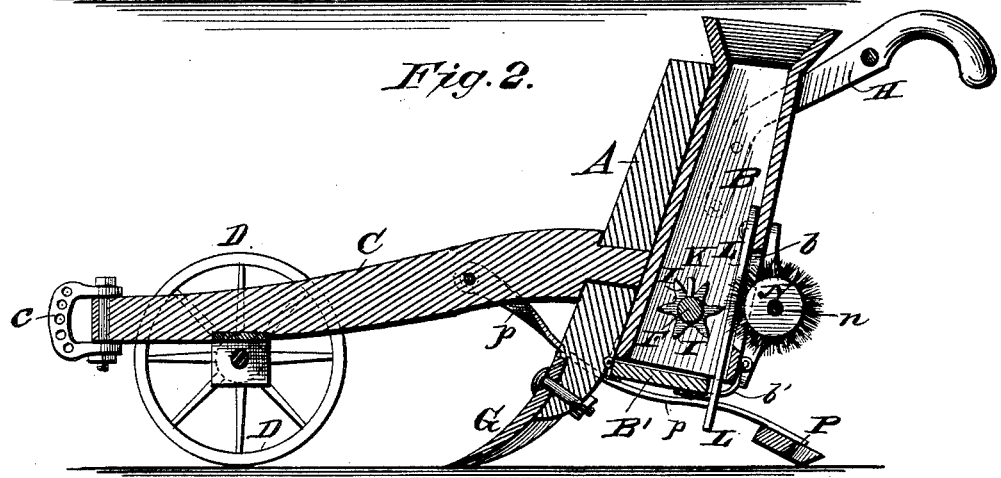
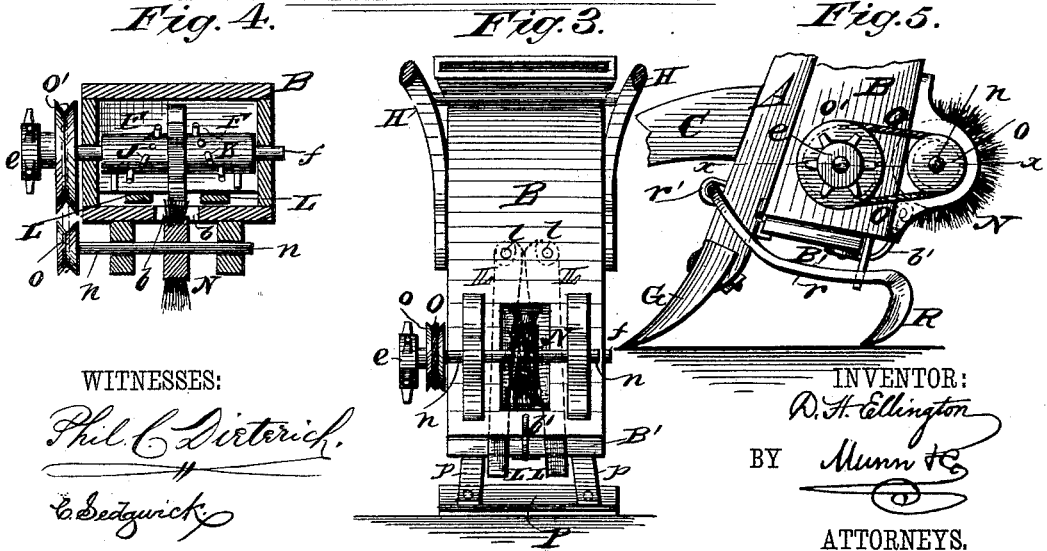
WITNESSES:
Phil. C. Dieterich
C. Sedgwick
INVENTOR:
D. H. Ellington
BY Munn & Co.
ATTORNEYS.

UNITED STATES PATENT OFFICE.

DAVID H. ELLINGTON, OF CUTHBERT, GEORGIA.

COTTON-PLANTER.

SPECIFICATION forming part of Letters Patent No. 394,163, dated December 11, 1888.

Application filed December 8, 1887. Serial No. 257,290. (No model.)

*To all whom it may concern:*

Be it known that I, DAVID HARRISON ELLINGTON, of Cuthbert, in the county of Randolph and State of Georgia, have invented a new and Improved Cotton-Planter, of which the following is a full, clear, and exact description.

My invention relates to seed-planters, more particularly to cotton-planters, and has for its object to provide a simple, inexpensive, and efficient machine of this character which will open the furrow, drop the seed, and cover it in one passage over the field, and in a manner to economize seed and prevent uprooting or damage to the plants intended for full growth when the plants are chopped to a stand, and whereby time, labor, and money are saved in cultivating the crop. The machine may also be used advantageously for distributing fertilizers.

The invention consists in certain novel features of construction and combinations of parts of the seed-planter, all as hereinafter described and claimed.

Reference is to be had to the accompanying drawings, forming a part of this specification, in which similar letters of reference indicate corresponding parts in all the figures.

Figure 1 is a side elevation of my improved cotton-planter. Fig. 2 is a longitudinal sectional elevation of the planter. Fig. 3 is a rear view of the planter with parts broken away. Fig. 4 is a detail sectional plan view through the seed-hopper and on the line $x\,x$ in Fig. 5; and Fig. 5 is a detail side view of the lower portion of the seed-hopper and adjacent parts, with a modified form of coverer attached to the plow-foot.

The plow foot or standard A, to which the seed-hopper B is attached, is connected rigidly to a beam, C, to the forward end or part of which is journaled a driving-wheel, D, the axle of which is provided with a sprocket-wheel, $d$, from which a driving-chain, E, passes to a sprocket-wheel, $e$, on the shaft $f$ of the cylinder F, which rotates in the seed-hopper B and carries the seed to and through the discharge slot or opening $b$ of the hopper, as hereinafter more fully explained.

I attach the furrow-opening plow G to the foot A and directly in front of or next to the seed-hopper and some distance behind the draft-clevis $c$ and driving-wheel D, and whereby as the machine is drawn along by a hook or coupling connected to the clevis the plow will not be so liable to shift to one side or the other and leave the ridge by every little side draft on the clevis, and the planter may be much more easily guided by an attendant holding the handles H, fixed to the hopper, than when the plow-foot and plow are arranged considerably in front of the seed-hopper or near the draft-clevis; hence there is no occasion for dispensing with the opening-plow while planting crooked or hillside rows, as the machine may always be safely guided to keep the plow on the ridge. Consequently the work of opening the furrow by the plow and chopping and covering the seed may be always accomplished by the use of this one machine on any rough, sloping, or rolling land, which would compel the use of one machine to open the furrow and another to plant and cover the seed were the plow set far in front of the planter near the draft-clevis.

I make the interior or seed chamber of the hopper flaring from its upper to its lower part, as most clearly shown in Fig. 2 of the drawings, in order to prevent packing of the seed in the hopper to an extent which would prevent its free delivery or fall to the feeding-cylinder F at the lower part of the chamber, and the bottom B' of the hopper is hinged and provided with a suitable latch device, $b'$, allowing the bottom to be swung open for access to the hopper for cleaning it and the feeding-cylinder as occasion requires.

The feeding-cylinder F is provided at its central part with a toothed or star-shaped wheel, I, and two series of pins or teeth, J K, arranged, respectively, in right and left hand spiral lines on the periphery of the cylinder. The feed-wheel I is directly opposite the seed-exit slot $b$ at the rear side of the hopper B, and whereby, as the spirally-arranged cylinder-teeth J K carry the seed to the feed-wheel, it will force the seed out through the hopper-slot $b$ to the ground and in quantities regulated by a couple of thin seed-gage plates, L L, which are pivoted at $l\,l$ to the back wall of the hopper and preferably extend below its bottom to allow the plates to be conveniently swung or adjusted on their pivots $l$ to make a larger or smaller opening between their opposing edges at the slot *b* to pass more or less seed from the feed-wheel, and the plates may be closed together to prevent exit of seed from the hopper, as will readily be understood.

A shaft, *n*, journaled in suitable bearings at the back of the seed-hopper B, is provided with a brush, N, the peripheral bristles of which operate through the hopper-slot *b* and against and between the seed-gage plates L L, and as the brush is rotated by a belt, O, passing from a pulley, *o*, on the brush-shaft to a larger pulley, *o'*, on the feed-cylinder shaft *f*, the seed carried to and between the gage-plates will be caught by the brush and will be scattered or spread thinly and evenly in the furrow opened by the plow instead of being allowed to fall in matted masses or bunches in the furrow. The operation of this brush, in conjunction with the feed-wheel, is important whether the seed-gage plates L L be used or not, as the well-known sticky nature of cotton-seeds predisposes them to bunch together and fall in this manner to the ground, and when this occurs the plants will come up too thickly in some places and too thinly in other spots along the ridge, and when these plants are being chopped to a stand the chopping-hoe will, in cutting out the more thickly-grown plants, uproot or injure many plants which should be left standing in good condition for subsequent growth. It is obvious that when the seed are well spread by the brush and are not allowed to fall to the ground in bunches the plants growing from the seed may be much more easily chopped to a stand and with little or no danger of uprooting or injuring those left to grow, and by thus spreading the seed a far smaller quantity of selected and expensive seed will be required in planting the same area, and waste of both time and money is avoided.

By removing the brush N the machine may be used to distribute fertilizers in previously-opened furrows, or by using the plow G the furrow may be opened and the fertilizer dropped by one passage of the machine over the field.

For covering the dropped seed I may use an ordinary board-coverer, P, held to the plow-beam C by straps or bars *p p*, and shown in Figs. 1, 2, and 3 of the drawings; or, if it is preferred, the covering may be done by a couple of rooting-plows, R, formed on the extremities of a U-shaped metal bar, *r*, which is held at its bend to the plow-foot A by staples or bolts *r'*, and as will be understood from Fig. 5 of the drawings.

Having thus described my invention, what I claim as new, and desire to secure by Letters Patent, is—

1. The combination, in a seed-planter, of a seed-hopper and a brush journaled outside of or beyond the final seed-discharge opening and operating to scatter in a furrow the seed dropped from the hopper, substantially as herein set forth.

2. The combination, in a seed-planter, of a beam, a furrow-opening plow and seed-hopper held thereto, and a brush journaled outside of or beyond the final seed-discharge opening and operating to scatter the seed dropped from the hopper into the furrow opened by the plow, substantially as herein set forth.

3. The combination, in a seed-planter, of a beam, a furrow-opening plow, seed-hopper, and seed-coverers held thereto, and a brush journaled outside of or beyond the final seed-discharge opening and operating to scatter the seed dropped from the hopper into a furrow opened by the plow and in advance of the filling of the furrow by the coverers, substantially as herein set forth.

4. The combination, in a seed-planter, of a hopper having a seed-exit slot, adjustable gage-plates fitted at said slot to control the passage of seed, and a brush journaled for rotation in approximately vertical plane outside of the gage-plates and operating to scatter the dropped seed in a furrow, substantially as herein set forth.

5. The combination, in a seed-planter, of a beam, a furrow-opening plow, seed-hopper, and seed-coverers held thereto, adjustable gage-plates fitted at the seed-exit slot of the hopper to control the dropping of the seed, and a brush journaled for rotation in approximately vertical plane outside of the gage-plates and operating to scatter the dropped seed in a furrow cut by the plow and in advance of the filling of the furrow by the coverers, substantially as herein set forth.

6. In a seed-planter, the combination of the standard A, carrying a plow, G, a hopper, B, held to the standard and provided with a seed-slot, *b*, and a seed-feeding cylinder, the shaft of which carries wheels *e o'*, a beam, C, a drive-wheel, D, thereon, carrying a wheel, *d*, a belt, E, connecting the wheels *d e*, a brush, N, journaled on the hopper and operating at its slot *b* and carrying a wheel, *o*, and a belt, O, connecting the wheels *o o'*, substantially as described, for the purposes set forth.

DAVID H. ELLINGTON.

Witnesses:
H. O. BEALL,
MAY BEALL.